(12) United States Patent
Chang et al.

(10) Patent No.: US 11,099,979 B2
(45) Date of Patent: Aug. 24, 2021

(54) TESTING AND MODIFYING CALENDAR AND EVENT SENSITIVE TIMER SERIES DATA ANALYTICS

(71) Applicant: International Business Machines Corporation, Armonk, NY (US)

(72) Inventors: Yuan-Chi Chang, Armonk, NY (US); Long Vu, Chappaqua, NY (US); Timothy R. Dinger, Croton-on-Hudson, NY (US); Venkata N. Pavuluri, New Rochelle, NY (US); Lingtao Cao, Hayward, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/669,761

(22) Filed: Oct. 31, 2019

(65) Prior Publication Data
US 2021/0133090 A1 May 6, 2021

(51) Int. Cl.
*G06F 11/36* (2006.01)
*G06F 8/60* (2018.01)

(52) U.S. Cl.
CPC ............ *G06F 11/3692* (2013.01); *G06F 8/60* (2013.01); *G06F 11/3664* (2013.01); *G06F 11/3688* (2013.01)

(58) Field of Classification Search
CPC ............ G06F 11/3692; G06F 11/3664; G06F 11/3688; G06F 8/60
(Continued)

(56) References Cited

U.S. PATENT DOCUMENTS 6,192,489 B1 2/2001 Griess et al.
6,199,204 B1 * 3/2001 Donohue ................. G06F 8/65
705/59
(Continued)

FOREIGN PATENT DOCUMENTS

CN 103874224 B 10/2017

OTHER PUBLICATIONS

Chen et al, "Characterizing Scheduling Delay for Low-latency Data Analytics Workloads", IEEE, pp. 630-639 (Year: 2018).*
(Continued)

*Primary Examiner* — Anil Khatri
(74) *Attorney, Agent, or Firm* — Stephen J. Walder, Jr.; William J. Stock; Francis Lammes (57) ABSTRACT

A mechanism is provided to identify wall-clock time reference dependency in one or more software components of a data analytics solution. The data analytics solution is decomposed into a set of software components. A first software component of the set of software components is deployed to a first computer server and the remaining software components are deployed to a second computer server. A system clock time on the first computer server is changed to differ from the system clock of the second computer server. Based on executing a test on the data analytics solution, a determination is made of whether the first software component, is wall-clock time independent. Responsive to the test of the of the software component failing indicating that the wall-clock time of the software component is dependent of the system clock time difference, the software component is recorded as wall-clock time dependent and an administrator is notified.

17 Claims, 5 Drawing Sheets

(58) Field of Classification Search
USPC .................................. 717/125–135, 170–175
See application file for complete search history.

(56) References Cited

U.S. PATENT DOCUMENTS

| | | | | |
|---|---|---|---|---|
| 6,324,485 | B1 * | 11/2001 | Ellis | G01R 31/31905 |
| | | | | 702/108 |
| 6,606,744 | B1 * | 8/2003 | Mikurak | H04L 29/06 |
| | | | | 717/174 |
| 7,490,081 | B2 * | 2/2009 | Best | G06F 16/334 |
| 8,151,248 | B1 * | 4/2012 | Butler | G06F 11/368 |
| | | | | 717/124 |
| 8,302,093 | B2 * | 10/2012 | Berg | G06F 8/60 |
| | | | | 717/177 |
| 8,381,208 | B2 * | 2/2013 | Burke | G06F 11/3409 |
| | | | | 717/174 |
| 8,429,612 | B2 * | 4/2013 | Milov | G06F 11/3692 |
| | | | | 717/124 |
| 8,578,337 | B2 * | 11/2013 | Van Riel | G06F 8/60 |
| | | | | 717/126 |
| 8,615,741 | B2 * | 12/2013 | Hudson | G06F 11/327 |
| | | | | 717/125 |
| 8,874,526 | B2 * | 10/2014 | Hsieh | G06F 16/24568 |
| | | | | 707/672 |
| 9,043,761 | B2 * | 5/2015 | Artzi | G06F 11/3692 |
| | | | | 717/131 |
| 9,229,226 | B2 | 1/2016 | Yi et al. | |
| 9,514,037 | B1 * | 12/2016 | Dow | G06F 11/3688 |
| 9,514,107 | B1 * | 12/2016 | Boswell | G06F 8/38 |
| 9,558,106 | B1 * | 1/2017 | Moniz | G06F 11/3692 |
| 9,639,452 | B2 * | 5/2017 | Elias | G06F 11/3668 |
| 10,102,449 | B1 * | 10/2018 | Cosic | G06K 9/66 |
| 10,338,993 | B1 * | 7/2019 | Lekivetz | G06F 11/0709 |
| 10,489,283 | B2 * | 11/2019 | Maczuba | G06F 11/3692 |
| 2012/0159519 | A1 | 6/2012 | Matsuda | |
| 2017/0109678 | A1 | 4/2017 | Chu et al. | |
| 2018/0089375 | A1 | 3/2018 | Carroll et al. | |
| 2018/0181543 | A1 | 6/2018 | Levin | |

OTHER PUBLICATIONS

Slavakis et al, Modeling and Optimization for Big Data Analytics, IEEE, pp. 1-14 (Year: 2014).*

Taneja et al, "Distributed Decomposed Data Analytics in Fog Enabled IoT Deployments", IEEE, pp. 1-13 (Year: 2019).*

Ousterhout et al, "Monotasks: Architecting for Performance Clarity in Data Analytics Frameworks", ACM, pp. 184-200 (Year: 2017).*

El-Hasnony et al, "Improved Feature Selection Model for Big Data Analytics", IEEE, p. 66989-67004 (Year: 2020).*

Buono et al, "Optimizing Sparse Matrix-Vector Multiplication for Large-Scale Data Analytics", ACM, pp. 1-12 (Year: 2016).*

Uzunov et al, "Decomposing Distributed Software Architectures for the Determination and Incorporation of Security and Other Non-Functional Requirements", IEEE, pp. 30-39 (Year: 2013).*

Karande et al, "BCD: Decomposing Binary Code Into Components Using Graph-Based Clustering", ACM, pp. 393-398 (Year: 2018).*

* cited by examiner

TESTING AND MODIFYING CALENDAR AND EVENT SENSITIVE TIMER SERIES DATA ANALYTICS

BACKGROUND

The present application relates generally to an improved data processing apparatus and method and more specifically to mechanisms for testing and modifying calendar and event sensitive time series data analytics.

Wall time, also called real-world time or wall-clock time, refers to elapsed time as determined by a chronometer such as a wristwatch or wall clock. (The reference to a wall clock is how the term originally got its name.)

In practical computing, wall time is the actual time, usually measured in seconds that a program takes to run or to execute its assigned tasks. When the computer is multitasking, the wall time for each program is determined separately, and depends on how the microprocessor allocates resources among the programs. For example, if a computer multitasks using three different programs for a continuous period of 60 seconds, one program might consume 10 seconds of wall time, the second program 20 seconds, and the third program 30 seconds. But these are not contiguous blocks; instead they are allocated in a rotating fashion, similar to time-division multiplexing in communications practice.

For a computer user, the total amount of elapsed time, as measured in days, hours, minutes, and seconds (denoted in the form dd+hh:mm:ss) that the computer has worked on a specific job is measured in wall time. This is not necessarily a single, contiguous block of time, because a computer may (and usually does) perform more than one job over a given period.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to configure the processor to identify wall-clock time reference dependency in one or more software components of a data analytics solution. The illustrative embodiment decomposes the data analytics solution into a set of software components. The illustrative embodiment deploys a first software component of the set of software components to a first computer server. The illustrative embodiment deploys one or more other software components remaining in the set of software components to a second computer server. The illustrative embodiment changes a system clock time on the first computer server differs from the system clock of the second computer server. The illustrative embodiment executes a test on the deployed data analytics solution. The illustrative embodiment determines whether the first software component is wall-clock time independent based on the executed test. The illustrative embodiment records the software component as wall-clock time dependent in responsive to the test of the of the software component fails indicating that the wall-clock time of the software component is dependent of the system clock time difference between the first computer server and the second computer server. The illustrative embodiment then notifies an administrator of the software component being wall-clock time dependent.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As noted previously, wall time, also called real-world time or wall-clock time, refers to elapsed time as determined by a chronometer such as a wristwatch or wall clock. Testing time series data analytics that are specific to time of day, day of week, or holidays in a year should preferably remove wall-clock time references in a software implementation. For example, one such analytics may calculate in real time the likelihood of buying a café latte after 3 pm after getting the café latte drink at breakfast time on weekdays, i.e. purchases between 6 and 8 am from Monday to Friday. In another example, data analytics compares fitness app logs submitted during weekdays and weekends to determine if sleep patterns change on those nights and thus recommend early bedtime. Fitness app logs carry timestamps which are used to distinguish weekdays from weekends. In both examples, to test the analytics solution, however, unit tests and functional verification tests may be executed at any time during the week, manually or automatically, irrespective of hour of the day or day of the week.

Wall-clock time references in a time series analytics solution, however, pose challenges to testing conducted at any time of the day. In the examples above, if a café latte purchases or fitness app logs are timestamped by computer server clock, and joined with other sensor readings, such as user heart rates, tests must be executed in the morning on weekdays or in the second example, on weekdays and weekends. It is therefore preferable to remove wall-clock time references in various implementations of solution components.

Software implementations returning wall-clock time is supported in most programming and middleware languages. For example, in Java, Calendar.getInstance( ).getTime( ), System.currentTimeMillis( ), ZonedDateTime.now( ) all return current wall-clock time on the server where the program runs. Similarly, in C++, function calls such as std::chrono::system_clock::now( ) and time( ) also return wall-clock time. In Python, datetime.now( ), gmtime( ), calendar.month( ) do the same. In relational database language SQL, CURRENT_TIMESTAMP, GETDATE( ), GETUTCDATE( ) return database clock time. For time series data analytics, software developers naturally program these function calls in their implementation, thereby creating dependencies in many code paths, across multiple components in the solution.

Therefore, the illustrative embodiments relate generally to the testing of calendar date and hour sensitive time series data analytics. More specifically, the technique identifies, in a software solution, software components which explicitly reference wall-clock time, which makes it difficult to execute unit and functional verification tests using other time scales or at an accelerated rate of data playback. The illustrative embodiments teach an alternative method from code review by deploying components in a solution onto two or more computer servers, whose server clock is manipulated to fail test cases intentionally. Iterative relocation of components to clock updated servers helps to identify those with wall-clock time references, thereby speeding up fixes to identified components.

That is, the illustrative embodiments described herein provide a computer implemented method, data processing system, and computer program product for identifying homogeneous or heterogeneous components in a time series data analytics solution, where one or more of the components reference wall-clock time. The analytics solution is first decomposed into multiple components connected by networking communication messages such as RMI (remote method invocation), REST (Representational State Transfer), and JDBC™ (Java™ Database Connectivity). Decomposed software components are then deployed to two or more servers whose system clock times may be changed, Multiple iterations of time series data tests are then run with server clocks in sync followed by adjusting one or more clocks. Should tests fail, software running on servers with an adjusted clock that are likely referencing wall-clock time may be decomposed further for investigation. The iterations continue until all suspected components are identified. As a result, the components that are dependent upon wall-clock time references are identified and may be identified to appropriate personnel for modification to remove the references to wall-clock time or otherwise replace these references with suitable references to other time scales. The present invention addresses the problem of wall-clock time dependency identification, which is the necessary first step to investigate and fix the watt-clock time dependency.

The illustrative embodiments improve on current testing time series data analytics by, first, not requiring source code to be available for review and analysis. That is, the illustrative embodiments may utilize deployable compiled binaries of solution components. Second, the illustrative embodiments improve on current testing time series data analytics by identifying, at a coarse level, components and modules that reference wall-clock time in their implementation, each identified component to be further investigated to isolate the software defects, i.e. the portions of software referencing the wall-clock time. Third, the illustrative embodiments improve on current testing time series data analytics by addressing a software solution implemented with multiple programming languages and multiple middleware runtime. As software reuse and multi-tiered architecture are widely adopted, the illustrative embodiments excel at solving the problem in analytics software solution composed of heterogeneous component modules.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments of the present invention provides a methodology, apparatus, system and computer program product for identifying homogeneous or heterogeneous components in a time series data analytics solution, where one or more of the components reference wall-clock time. The analytics solution is first decomposed into multiple components connected by networking communication messages such as RMI (remote method invocation), REST (Representational State Transfer), and JDBC™ (Java™ Database Connectivity). Decomposed software components are then deployed to two or more servers whose system clock times may be changed. Multiple iterations of time series data tests are then run with server clocks in sync followed by adjusting one or more clocks. Should tests fail, software running on servers with an adjusted clock that are likely referencing wall-clock time may be decomposed further for investigation. The iterations continue until all suspected components are identified. As a result, the components that are dependent upon wall-clock time references are identified and may be identified to appropriate personnel for modification to remove the references to wall-clock time or otherwise replace these references with suitable references to other time scales. In some embodiments, automated mechanisms may be employed for automatically modifying the references to wall-clock time such that they are no longer dependent upon the wall-clock time and thus, can be executed using other time scales.

Figure 1:
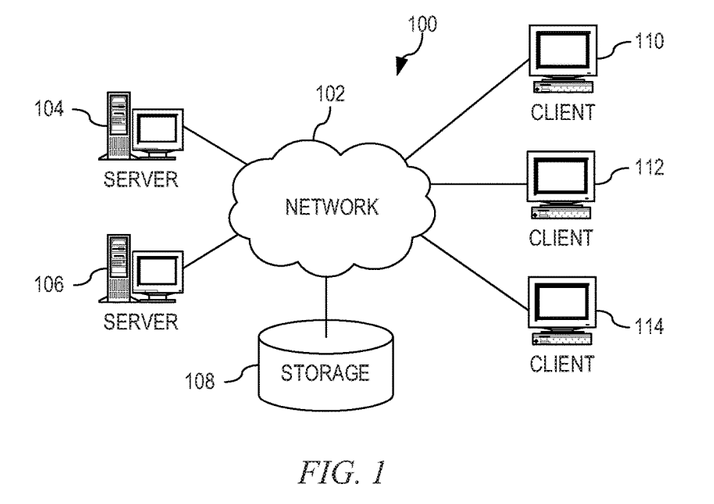
FIG. 1 is an example diagram of a distributed data processing system in which aspects of the illustrative embodiments may be implemented.
Figure 2:
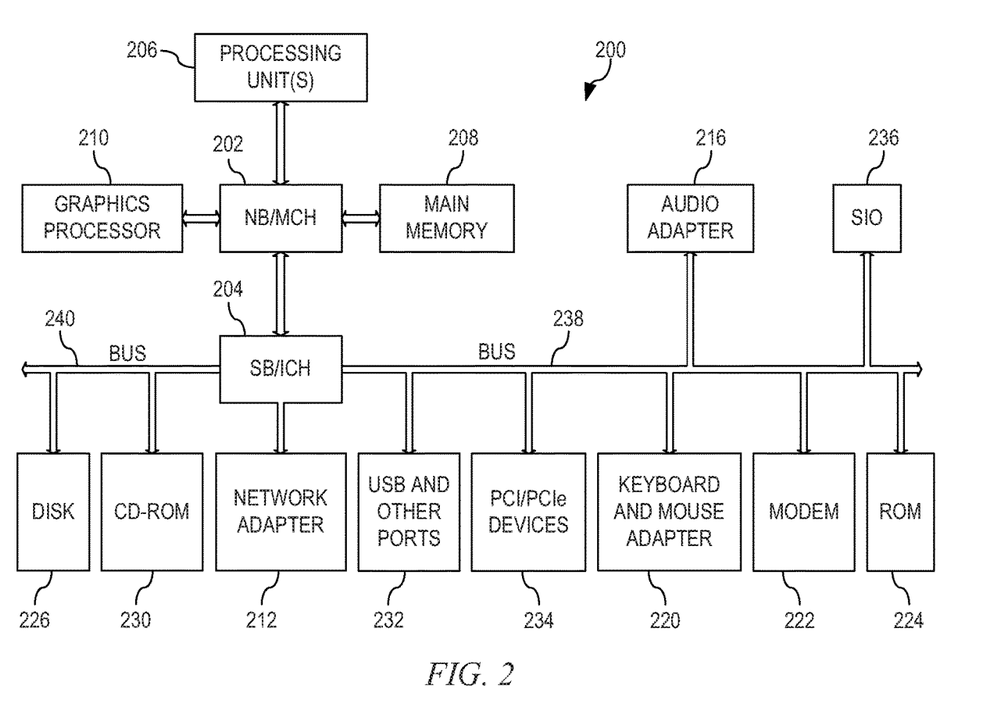
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a time series data analytics component identification mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates testing and modifying calendar and event sensitive time series data analytics.

As noted above, the mechanisms of the illustrative embodiments utilize specifically configured computing devices, or data processing systems, to perform the operations for testing and modifying calendar and event sensitive time series data analytics. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to testing and modifying calendar and event sensitive time series data analytics.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
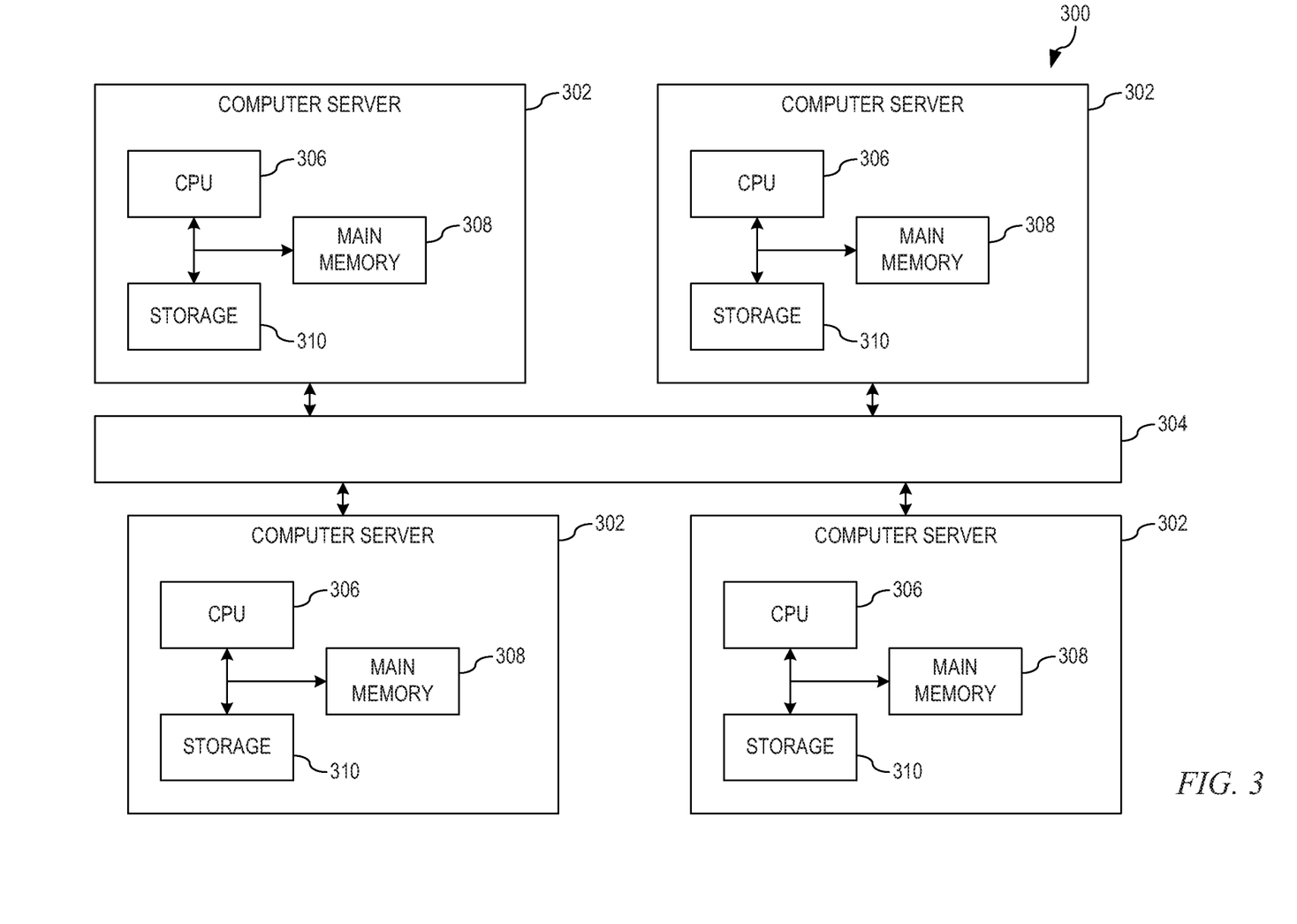
FIG. 3 depicts such a computer server cluster in which illustrative embodiments may be implemented in accordance with an illustrative embodiment.

As stated previously, the time series data analytics component identification mechanism may be implemented across a plurality of computer servers, thereby forming a computer server cluster. FIG. 3 depicts such a computer server cluster in which illustrative embodiments may be implemented in accordance with an illustrative embodiment. Computer server cluster 300 includes one or more computer servers 302 interconnected via network 304. Each computer server 302 comprises one or more central processing unit (CPU) 306, main memory 308, and storage devices 310. Code or instructions implementing the processes of the illustrative embodiments are located temporarily in the main memory 308 and executed by CPU 306. Storage devices 310 are used to store the instructions as well as graph data to be processed by computer server cluster 300. When the graph data requires more storage space than available on a single one of computer server 302 may be partitioned and stored across distributed ones of computer servers 302 in computer server cluster 300.

Figure 4:
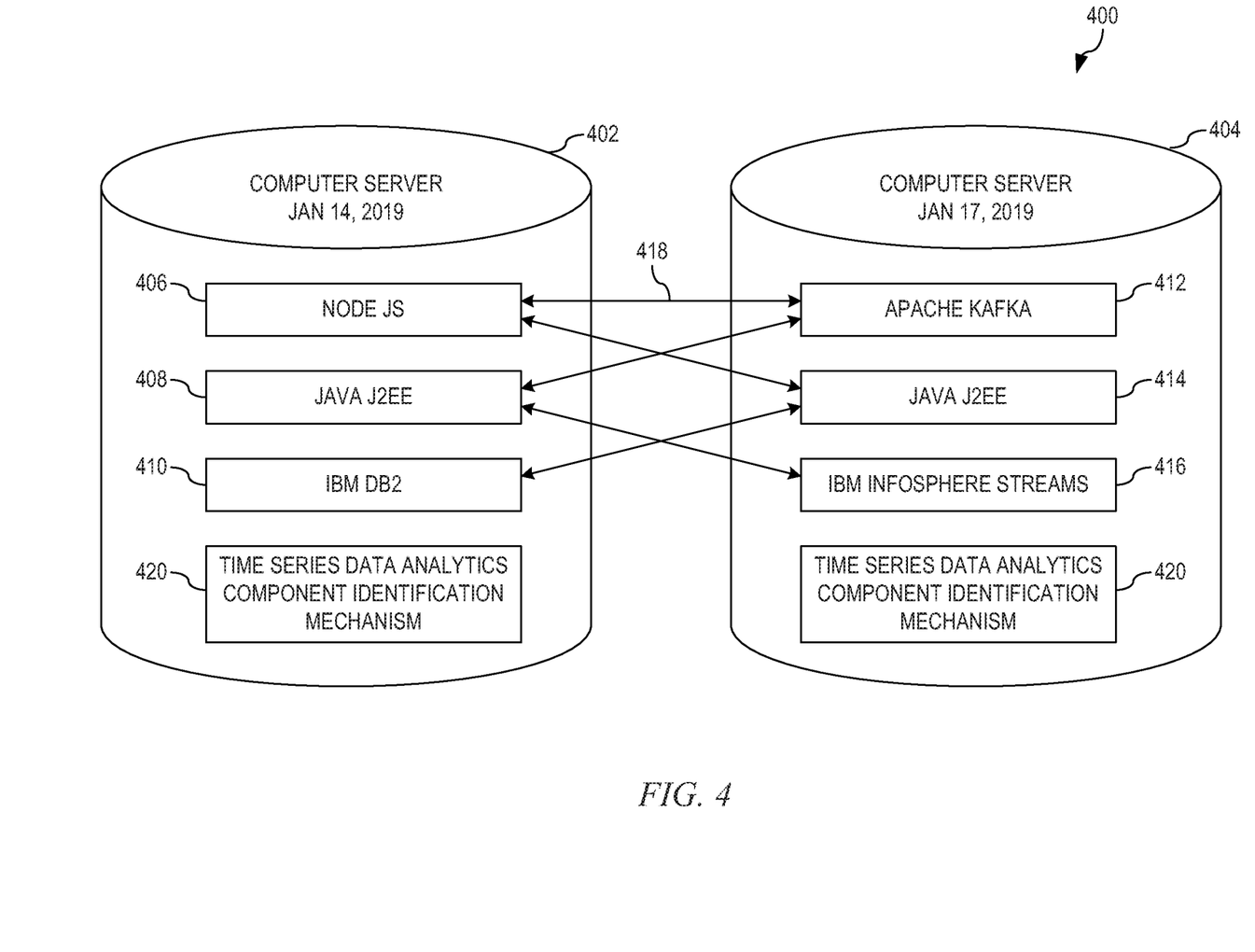
FIG. 4 depicts an implementation of a time series data analytics component identification mechanism onto two computer servers, such as computer servers 302 of FIG. 3, which have multiple heterogeneous software components deployed in accordance with an illustrative embodiment.

FIG. 4 depicts an implementation of a time series data analytics component identification mechanism onto two computer servers, such as computer servers 302 of FIG. 3, which have multiple heterogeneous software components deployed in accordance with an illustrative embodiment. Computer server cluster 400 comprises computer server 402 and computer server 404. Computer server 402 comprises installed software components of Node JS™ 1406, Java™ J2 EE™ 408, and IBM® DB2® 410. Computer server 404 comprises installed software components of Apache Kafka® 412, Java™ J2EE™ 414, and IBM® InfoSphere® Streams 416. Node JS™ 406 is written in C, C++ and JavaScript™. Java™ J2EE™ 408 and 414 are written in Java™, IBM® DB2® 410 processes SQL. Apache Kafka® 412 is written in Java™ IBM® InfoSphere® Streams 416 is written in C, C++, Java™, and SPL (Streams Programming Language).

Software components 406-416 deployed on computer servers 402 and 404 create an end-to-end solution to analyze time series data. In this simple, two-server computer server cluster 400, inter-component communications 418 may be exchanged via RMI (remote method invocation), REST (Representational State Transfer), JDBC™ (Java™ Database Connectivity), or the like. Software components 406-416 may be installed and configured to run on either server, although in practice, software components 406-416 may be deployed on pre-designated servers. In FIG. 4, each of computer servers 402 and 404 have a server system clock that may be changed by administration commands, as illustrated in the example showing Jan. 14, 2019 on computer server 402 and Jan. 17, 2019 on computer server 404.

Figure 5:
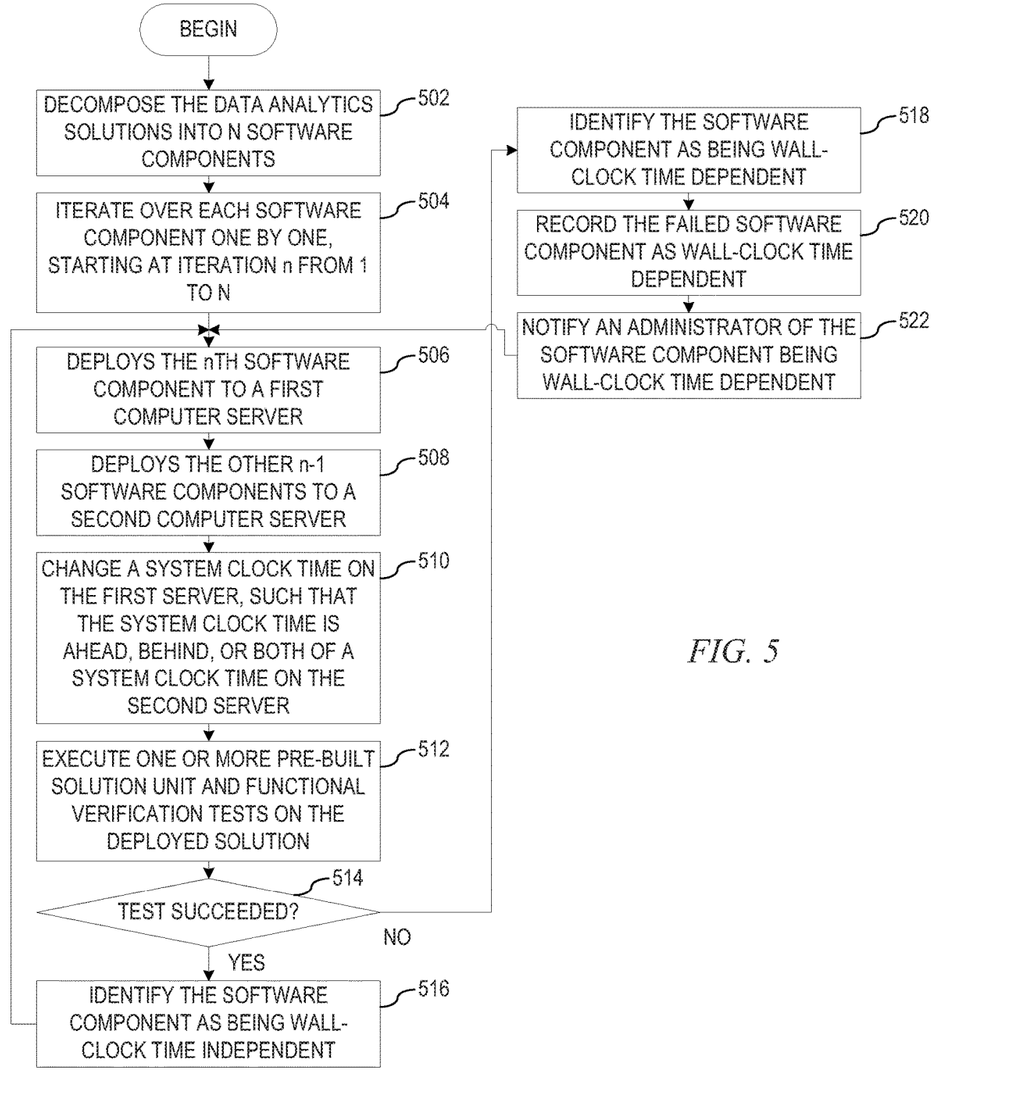
FIG. 5 depicts one exemplary implementation of time series data analytics component identification mechanism testing software components in a data analytics solution to identify those ones of software components with wall-clock time reference dependency in accordance with an illustrative embodiment.
Figure 6:
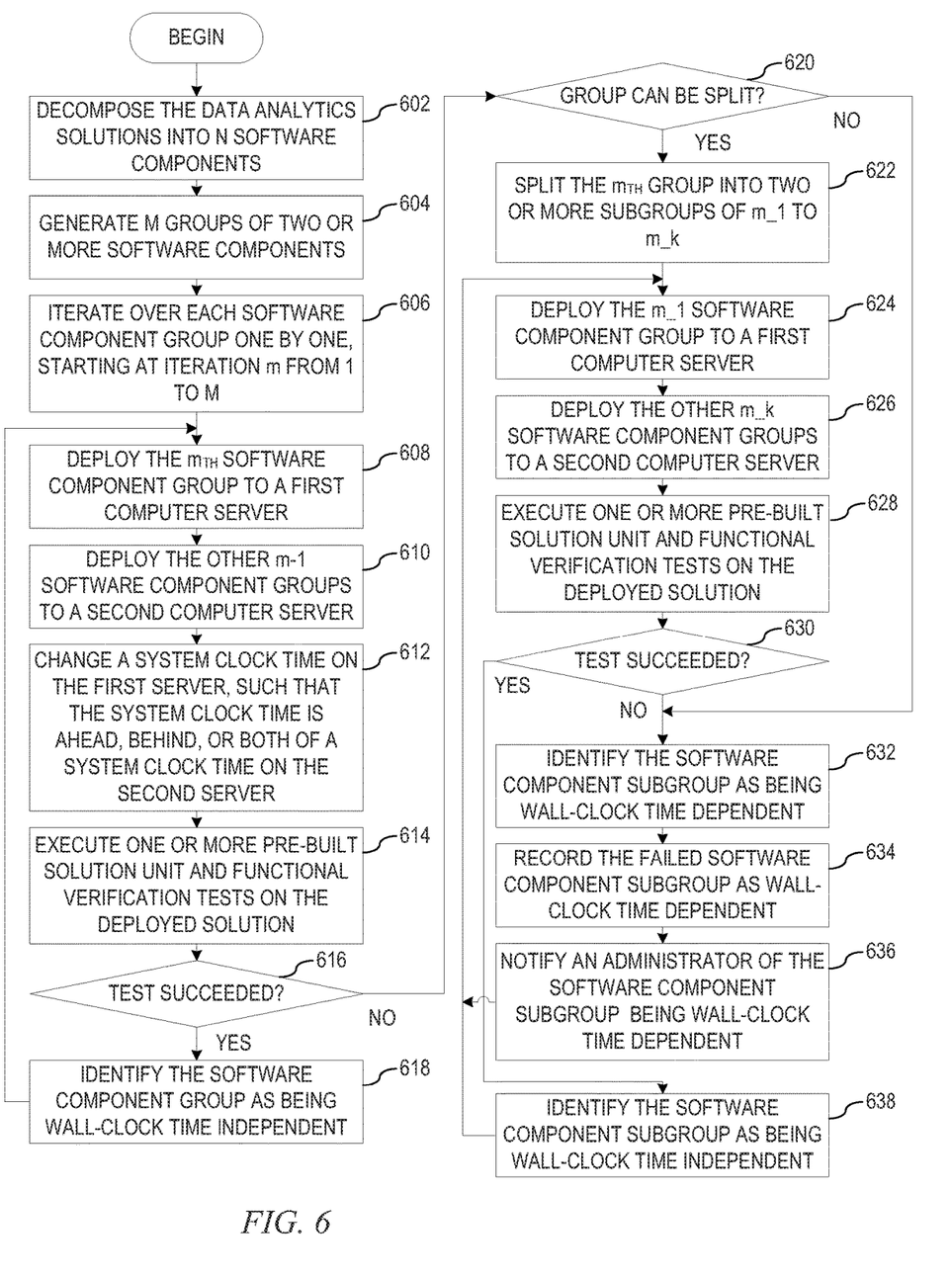
FIG. 6 depicts another exemplary implementation of time series data analytics component identification mechanism testing groups of software components in a data analytics solution to identify those groups of software components with wall-clock time reference dependency in accordance with an illustrative embodiment.

In order to test and modify calendar and event sensitive time series data analytics on each of computer servers 402 and 404, in accordance with the illustrative embodiments, time series data analytics component identification mechanism 420 is deployed on each of computer servers 402 and 404 and operates as detailed in FIGS. 5 and 6.

FIG. 5 depicts one exemplary implementation of time series data analytics component identification mechanism testing software components, such as software components 406-416 of FIG. 4, in a data analytics solution to identify those ones of software components with wall-clock time reference dependency in accordance with an illustrative embodiment. As the operation begins, time series data analytics component identification mechanism decomposes the data analytics solutions into N software components (step 502). The decomposition may fall in a natural architectural and/or middleware blocks, as in FIG. 4. In addition, time series data analytics component identification mechanism utilizes a finer grained identification, if possible, of functional modules within a decomposed software component if the functional modules are independently deployable. After componentized decomposition, the time series data analytics component identification mechanism iterates over each software component one by one, starting at iteration n from 1 to N (step 504). For the $n_{th}$ software component, time series data analytics component identification mechanism deploys the $n_{th}$ software component to a first computer server, i.e, computer server 402 of FIG. 4, (step 506) and deploys the other n-1 software components to a second computer server, i.e. computer server 404 of FIG. 4, (step 508). In practice, a large software solution may not fit on a single computer server and require more than one computer server. Thus, a computer server, such as the first computer server or the second computer server as referenced herein, may be a single physical computer server or a number of physical computer servers all sharing the same system clock time.

The time series data analytics component identification mechanism then changes a system clock time on the first computer server, such that the system clock time is ahead, behind, or both of a system clock time on the second computer server (step 510). It is by the nature of time series data analytics that the changed delta may be multiple hours, days, weeks, months, or the like. For example, data analytics to compare weekdays and weekends demands the test to offset system clock time by days to ensure wall-clock time reference dependency is surfaced by failing test cases built on weekdays and weekends comparison.

The time series data analytics component identification mechanism then executes one or more pre-built solution unit and functional verification tests on the deployed solution, i.e. the $n_{th}$ software component on the first computer server and the other n-1 software components on the second computer server (step 512). In executing the one or more pre-built solution unit and functional tests, one or multiple series of timestamped data is read into the solution with predetermined output expected. For example, using the previously mentioned breakfast café latte example, a timestamped sales record associated with a user id consist of latte bought at 7 am in the morning and 4 pm in the afternoon on Monday, Oct. 21, 2019, 7:30 am and 3:45 pm on Tuesday, Oct. 22, 7:15 am and 3:15 pm on Wednesday, Oct. 23. The test is to output a high likelihood prediction about the user buying another latte in the afternoon after getting his breakfast latte at 7:10 am on Thursday, Oct. 24, 2019. The new sale transaction carries the timestamp of 7:10 am, Oct. 24, and the analytical software should predict an afternoon latte purchase on the same day. Following this example, when the test is executed at 5 pm on Friday, Oct. 25, or any other time or day, correctly implemented software should generate a high likelihood prediction on the afternoon latte. The test fails if a high likelihood prediction was not generated.

The time series data analytics component identification mechanism then determines whether the $n_{th}$ software component is wall-clock time independent (step 514) by failed tests, as illustrated in the above example. If at step 514 the time series data analytics component identification mechanism determines that the test of the software component succeeds indicating that the wall-clock time of the software component is independent of the system clock time between the first computer server and the second computer server, the time series data analytics component identification mechanism identifies the software component as being wall-clock time independent (step 516), with the operation proceeding to the next software component at step 506.

If at step 514 the time series data analytics component identification mechanism determines that the test of the software component fails indicating that the wall-clock time of the software component is dependent of the system clock time between the first computer server and the second computer server, the time series data analytics component identification mechanism identifies the software component as being wall-clock time dependent (step 518). If at step 518 the indication is that the software component is wall-clock time dependent, the time series data analytics component identification mechanism records the failed software component as wall-clock time dependent (step 520) and notifies an administrator of the software component being wall-clock time dependent (step 522) before moving to test the next component at step 506.

FIG. 6 depicts another exemplary implementation of time series data analytics component identification mechanism testing groups of software components, such as software components 406-416 of FIG. 4, in a data analytics solution to identify those groups of software components with wall-clock time reference dependency in accordance with an illustrative embodiment. As the operation begins, time series data analytics component identification mechanism decomposes the data analytics solutions into N software components (step 602). The decomposition may fall in a natural architectural and/or middleware blocks, as in FIG. 4. In addition, time series data analytics component identification mechanism utilizes a finer grained identification, if possible, of functional modules within a decomposed software component if the functional modules are independently deployable. After componentized decomposition, the time series data analytics component identification mechanism may generate M groups of two or more software components in order to accelerate the identification procedure by testing groups of software components (step 604). The time series data analytics component identification mechanism then iterates over each software component group one by one, starting at iteration m from 1 to M (step 606). For the $m_{th}$ software component group, time series data analytics component identification mechanism deploys the $m_{th}$ software component group to a first computer server, i.e. computer server 402 of FIG. 4, (step 608) and deploys the other m-1 software component groups to a second computer server, i.e. computer server 404 of FIG. 4, (step 610). In practice, a large software solution may not fit on a single computer server and require more than one computer server. Thus, a computer server, such as the first computer server or the second computer server as referenced herein, may be a single physical computer server or a number of physical computer servers all sharing the same system clock time.

The time series data analytics component identification mechanism then change a system clock time on the first computer server, such that the system clock time is ahead, behind, or both of a system clock time on the second computer server (step 612). It is by the nature of time series data analytics that the changed delta may be multiple hours, days, weeks, months, or the like. For example, data analytics to compare weekdays and weekends demands the test to offset system clock time by days to ensure wall-clock time reference dependency is surfaced by failing test cases built on weekdays and weekends comparison.

The time series data analytics component identification mechanism then executes one or more pre-built solution unit and functional verification tests on the deployed solution, i.e, the $m_{th}$ software component group on the first computer server and the other m-1 software component groups on the second computer server (step 614). An example of the executing the one or more pre-built solution unit and functional verification tests on the deployed solution is exemplified in FIG. 5. The time series data analytics component identification mechanism then determines whether the $m_{th}$ group of software components is wall-clock time independent (step 616). If at step 616 the time series data analytics component identification mechanism determines that the test of the software component group succeeds indicating that the wall-clock time of the software component group is independent of the system clock time between the first computer server and the second computer server, the time series data analytics component identification mechanism identifies the software component group as being wall-clock time independent (step 618), with the operation proceeding to the next software component group or subgroup at step 608.

If at step 616 the time series data analytics component identification mechanism determines that the test of the software component group fails indicating that the wall-clock time of the software component group is dependent of the system clock time between the first computer server and the second computer server, the time series data analytics component identification mechanism determines whether the group/subgroup may be split (step 620). If at step 620 the group may be split, the time series data analytics component identification mechanism splits the $m_{th}$ group into two or more subgroups of m_1 to m_k (step 622). For the m_1 software component group, time series data analytics component identification mechanism deploys the m_1 software component subgroup to a first computer server, i.e. computer server 402 of FIG. 4, (step 624) and deploys the other m_k software component subgroups to a second computer server, i.e. computer server 404 of FIG. 4, (step 626).

The time series data analytics component identification mechanism then executes one or more pre-built solution unit and functional verification tests on the deployed solution, iterating through each software component subgroup o from m_1 to m_k (step 628). The time series data analytics component identification mechanism then determines whether the software subgroup component is wall-clock time independent (step 630). If at step 630 the time series data analytics component identification mechanism determines that the test of the software component subgroup fails indicating that the wall-clock time of the software component subgroup is dependent of the system clock time between the first computer server and the second computer server, the time series data analytics component identification mechanism identifies the software component subgroup as being wall-clock time dependent (step 632). The time series data analytics component identification mechanism then records the failed software component subgroup as wall-clock time dependent (step 634) and notifies an administrator of the software component subgroup being wall-clock time dependent (step 636) before moving to test the next software component subgroup at step 624.

If at step 630 the time series data analytics component identification mechanism determines that the test of the software component subgroup succeeds indicating that the wall-clock time of the software component subgroup is independent of the system clock time between the first computer server and the second computer server, the time series data analytics component identification mechanism identifies the software component subgroup as being wall-clock time independent (step 638), with the operation proceeding to the next software component subgroup at step 624. If at step 620 the group/subgroup may not be split, the operation proceeds to step 632.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Thus, the illustrative embodiments provide mechanisms for identifying homogeneous or heterogeneous components in a time series data analytics solution, where one or more of the components reference wall-clock time. The analytics solution is first decomposed into multiple components connected by networking communication messages. Decomposed software components are then deployed to two or more servers whose system clock times may be changed. Multiple iterations of time series data tests are then run with server clocks in sync followed by adjusting one or more clocks. Should tests fail, software running on servers with an adjusted clock that are likely referencing wall-clock time may be decomposed further for investigation. The iterations continue until all suspected components are identified. As a result, the components that are dependent upon wall-clock time references are identified and may be identified to appropriate personnel for modification to remove the references to wall-clock time or otherwise replace these references with suitable references to other time scales.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to configure the at least one processor to identify wall-clock time reference dependency in one or more software components of a data analytics solution, the method comprising:
   decomposing the data analytics solution into a set of software components, wherein decomposing the data analytics solution into the set of software components decomposes the set of software components into one or more functional modules that are independently deployable;
   deploying a first functional module of the set of software components to a first computer server;
   deploying one or more other functional modules remaining in the set of software components to a second computer server;
   changing a system clock time on the first computer server to differ from the system clock of the second computer server;
   executing a test on the deployed data analytics solution;
   based on the executed test, determining whether the first functional module is wall-clock time independent;
   responsive to the test of the of the first functional module failing thereby indicating that the wall-clock time of the first functional module is dependent of the system clock time difference between the first computer server and the second computer server, recording the first functional module as wall-clock time dependent; and
   notifying an administrator of the first functional module being wall-clock time dependent.

2. The method of claim 1, further comprising:
   responsive to the test of the of the first functional module succeeding thereby indicating that the wall-clock time of the first functional module is independent of the system clock time difference between the first computer server and the second computer server, identifying the first functional module as being wall-clock time independent; and
   notifying an administrator of the first functional module being wall-clock time independent.

3. The method of claim 1, wherein the change of the system clock time on the first computer server to differ from the system clock of the second computer server is one of the system clock time is being ahead of or being behind the system clock time of the second computer server.

4. The method of claim 1, wherein the change of the system clock time on the first computer server to differ from the system clock of the second computer server is one of hours, days, weeks, or months.

5. The method of claim 1, wherein the test is a pre-built solution unit and functional verification test.

6. The method of claim 1, wherein the first functional module in the set of software components is a group of functional modules that, when the test of the of the first functional module failing thereby indicating that the wall-clock time of the first functional module is dependent of the system clock time difference between the first computer server and the second computer server, the group of functional modules is split into one or more subgroups that are individually tested.

7. A computer program product comprising a computer readable storage medium having a computer readable program stored therein, wherein the computer readable program, when executed on a data processing system, causes the data processing system to identify wall-clock time reference dependency in one or more software components of a data analytics solution, and further causes the data processing system to:

decompose the data analytics solution into a set of software components,
wherein decomposing the data analytics solution into the set of software components decomposes the set of software components into one or more functional modules that are independently deployable;
deploy a first module of the set of software components to a first computer server;
deploy one or more other functional modules remaining in the set of software components to a second computer server;
change a system clock time on the first computer server to differ from the system clock of the second computer server;
execute a test on the deployed data analytics solution;
based on the executed test, determine whether the first functional module is wall-clock time independent;
responsive to the test of the of the first functional module failing thereby indicating that the wall-clock time of the first functional module is dependent of the system clock time difference between the first computer server and the second computer server, record the first functional module as wall-clock time dependent; and
notify an administrator of the first functional module being wall-clock time dependent.

8. The computer program product of claim 7, wherein the computer readable program further causes the data processing system to:

responsive to the test of the of the first functional module succeeding thereby indicating that the wall-clock time of the first functional module is independent of the system clock time difference between the first computer server and the second computer server, identify the functional module as being wall-clock time independent; and
notify an administrator of the first functional module being wall-clock time independent.

9. The computer program product of claim 7, wherein the change of the system clock time on the first computer server to differ from the system clock of the second computer server is one of the system clock time is being ahead of or being behind the system clock time of the second computer server.

10. The computer program product of claim 7, wherein the change of the system clock time on the first computer server to differ from the system clock of the second computer server is one of hours, days, weeks, or months.

11. The computer program product of claim 7, wherein the test is a pre-built solution unit and functional verification test.

12. The computer program product of claim 7, wherein the first functional module in the set of software components is a group of functional modules that, when the test of the of the first functional module failing thereby indicating that the wall-clock time of the first functional module is dependent of the system clock time difference between the first computer server and the second computer server, the group of functional modules is split into one or more subgroups that are individually tested.

13. An apparatus comprising:
at least one processor; and
at least one memory coupled to the at least one processor, wherein the at least one memory comprises instructions which, when executed by the at least one processor, cause the at least one processor to identify wall-clock time reference dependency in one or more software components of a data analytics solution, and further cause the at least one processor to:
decompose the data analytics solution into a set of software components, wherein decomposing the data analytics solution into the set of software components decomposes the set of software components into one or more functional modules that are independently deployable;
deploy a first functional module of the set of software components to a first computer server;
deploy one or more other functional modules remaining in the set of software components to a second computer server;
change a system clock time on the first computer server to differ from the system clock of the second computer server;
execute a test on the deployed data analytics solution;
based on the executed test, determine whether the first functional module is wall-clock time independent;
responsive to the test of the of the first functional module failing thereby indicating that the wall-clock time of the first functional module is dependent of the system clock time difference between the first computer server and the second computer server, record the first functional module as wall-clock time dependent; and
notify an administrator of the first functional module being wall-clock time dependent.

14. The apparatus of claim 13, wherein the instructions further cause the at least one processor to:
responsive to the test of the of the first functional module succeeding thereby indicating that the wall-clock time of the first functional module is independent of the system clock time difference between the first computer server and the second computer server, identify the functional module as being wall-clock time independent; and
notify an administrator of the first functional module being wall-clock time independent.

15. The apparatus of claim 13, wherein the change of the system clock time on the first computer server to differ from the system clock of the second computer server is one of the system clock time is being ahead of or being behind the system clock time of the second computer server.

16. The apparatus of claim 13, wherein the change of the system clock time on the first computer server to differ from the system clock of the second computer server is one of hours, days, weeks, or months.

17. The apparatus of claim 13, wherein the first functional module in the set of software components is a group of functional modules that, when the test of the of the first functional module failing thereby indicating that the wall-clock time of the first functional module is dependent of the system clock time difference between the first computer server and the second computer server, the group of functional modules is split into one or more subgroups that are individually tested.

\* \* \* \* \*